United States Patent
Saito et al.

(10) Patent No.: US 6,992,736 B2
(45) Date of Patent: Jan. 31, 2006

(54) LIQUID CRYSTAL DISPLAY DEVICE

(75) Inventors: Ken Saito, Mobara (JP); Toshiyuki Asou, Chiba (JP); Masahiko Kurihara, Togane (JP)

(73) Assignees: Hitachi, Ltd., Tokyo (JP); Hitachi Electronics Devices Co., Ltd., Mobara (JP)

( * ) Notice: Subject to any disclaimer, the term of this patent is extended or adjusted under 35 U.S.C. 154(b) by 108 days.

(21) Appl. No.: 10/350,063

(22) Filed: Jan. 24, 2003

(65) Prior Publication Data

US 2003/0164903 A1 Sep. 4, 2003

(30) Foreign Application Priority Data

Jan. 24, 2002 (JP) ........................ 2002-015991

(51) Int. Cl.
*G02F 1/1333* (2006.01)

(52) U.S. Cl. .......................... 349/58; 349/65
(58) Field of Classification Search .................. 349/58, 349/61, 65, 60; 362/31, 32; 361/680, 681
See application file for complete search history.

(56) References Cited

U.S. PATENT DOCUMENTS

| 5,946,062 | A | * | 8/1999 | Hasegawa et al. | ............ 349/58 |
| 6,046,785 | A | * | 4/2000 | Won | ............... 349/58 |
| 6,502,948 | B2 | * | 1/2003 | Iwatsuki | ............ 362/31 |
| 6,538,710 | B1 | * | 3/2003 | Jang | ............... 349/65 |

FOREIGN PATENT DOCUMENTS

| JP | 2000-77724 | | 3/2000 |
| JP | 2000-250014 | * | 9/2000 |
| JP | 2002-131725 | * | 5/2002 |
| JP | 2002-156632 | * | 5/2002 |

* cited by examiner

*Primary Examiner*—Toan Ton
(74) *Attorney, Agent, or Firm*—Antonelli, Terry, Stout & Kraus, LLP

(57) ABSTRACT

A liquid crystal display device which efficiently introduces radiation light of light-emitting elements to a light guide body to thereby obtain a uniformly bright display screen. The liquid crystal display device includes a liquid crystal display panel, a light guide body installed at a back face of the liquid crystal display panel, a light-emitting element disposed proximate to a side wall of the light guide body, and a mold case having an elastic support structure which hold the light guide body and biases the light guide body toward the light-emitting element.

17 Claims, 6 Drawing Sheets

US 6,992,736 B2

LIQUID CRYSTAL DISPLAY DEVICE

BACKGROUND OF THE INVENTION

1. Field of the Invention

The present invention relates generally to liquid crystal display devices and, more particularly, to a liquid crystal display device having a light guide body with a solid-state light-emitting element such as a light-emitting diode or diodes disposed at a side edge of the light guide body for use as a light source of the device.

2. Description of Related Art

In small size information terminals such as portable or handheld wireless telephone handsets and mobile information terminals or the like, it is a general approach to employ as their display devices liquid crystal display devices which are small in size and light in weight while offering power saving capabilities. These liquid crystal display devices include, but are not limited to, devices which utilize external light as the requisite illumination for visualization of an electronic latent image as formed on a liquid crystal display panel and devices with an auxiliary illumination device being installed on the back or front surface of a liquid crystal display panel. The auxiliary illumination device that is installed at the back face of the liquid crystal display panel is called a backlight whereas the auxiliary illumination device that is installed at the front face thereof is known as a front light.

Although an auxiliary illumination device of mobile terminals of this type is known which has a light guide body utilizes as a light source a cold cathode fluorescent lamp disposed at a side wall (side edge) of the light guide body as in the currently available notebook personal computers (PCs) or the like which are relatively large in display screen size, solid-state light-emitting elements of less power consumption—typically, light-emitting diodes (LEDs)—are used in many cases in the handheld wireless telephone handsets and small size mobile information terminals (such as personal digital assistants or "PDAs") in place of the cold cathode fluorescent lamp.

FIG. 8 is a cross-sectional diagram for pictorial representation of a main part structure example of a conventional liquid crystal display device which has a backlight unit using light-emitting diodes for its light guide body as the required light-emitting elements. This type of backlight is such that more than one light-emitting diode LED is provided in such a way as to oppose a side wall (side edge) of the light guide body GLB which is installed on the back face of a liquid crystal display panel PNL. Here, the light-emitting diode LED is mounted on a printed circuit board PCB so that it stands upward by in the manner of a planted tree.

The printed circuit board PCB is either a hard printed circuit board or a flexible printed circuit board, which has its back surface (opposite face to the light-emitting diode LED) with driver ICs and other electronic components mounted thereon. The light-emitting diode LED is disposed so that its light emission portion E is in contact with a side edge of the light guide body GLB. Light that is output from the light emission portion E of the light-emitting diode LED is introduced into the light guide body GLB with this side wall as a light entry plane. It is noted that JP-A-2000-77724 discloses therein a optical semiconductor element packing structure relating to the LED mounting technique with respect to the light guide body PCB.

While the light-emitting diode LED is mounted on the printed circuit board PCB and is disposed so on to oppose the light entry plane of the light guide body GLB, if the light-emitting diode LED (its light emission portion E) and the light guide body GLB fail to be in close contact with each other, then light leakage occurs from a gap space therebetween or alternatively irregular reflection can take place in this gap space. The light leakage or irregular reflection result in a decrease in light utilization efficiency, which in turn serves as a serious bar to improvements in brightness or luminance of the display screen of the liquid crystal display device.

In addition, as the light-emitting diode LED is inherently a point light source, the luminance of light being introduced onto the light entry plane of the light guide body GLB has a local brightness, and thus, it becomes difficult to uniformly illuminate the display screen of the liquid crystal display panel.

SUMMARY OF THE INVENTION

An object of the present invention is to provide a liquid crystal display device capable of obtaining a uniformly bright display screen by efficiently introducing radiation light of a light-emitting element or elements such as light-emitting diodes or the like.

To attain the foregoing object, the present invention provides a liquid crystal display device a structure which enables continuous close contact between a light-emitting element such as a light-emitting diode and the light entry plane of a light guide body.

According to a feature of the present invention, the structure include a mold case which receives or accommodates therein the light guide body and the light-emitting element such as the light-emitting diode and which continuously biases the light emitting element and light guide body toward one another. The mold case also has reflection patterns on one of both surfaces of the light guide body.

In accordance with the present invention, the reflection pattern of the light guide body may be formed only on the light guide body's back surface (principal surface that does not oppose a liquid crystal display panel) and/or the reflection pattern on the principal surface of, the light guide body may be spaced apart from the side at which the light-emitting element such as the light-emitting diode is provided.

According to a first embodiment of a liquid crystal display device of the present invention, for example, there is provided a liquid crystal display panel, a light guide body installed at a back face of the liquid crystal display panel, a light-emitting element disposed near to a side wall of the light guide body, and a mold case comprising an elastic support structure to bias the light guide body in contact with the light-emitting element and to hold therein the light guide body.

According to a modification of the first embodiment of the present invention, the light guide body includes reflection patterns on a surface thereof.

According to another modification, the light guide body includes reflection patterns on both surfaces thereof.

According to another modification of the first embodiment of the present invention, the mold case holds therein the light guide body and the light-emitting element.

According to another modification of the first embodiment of the present invention, the mold case includes a first edge and a second edge, the light-emitting element is disposed proximate to the first edge and at least an elastic support structure of the mold case is formed at the second edge, so that the elastic support structure biases the light guide body toward the first edge and in continuous contact with the light-emitting element. According to another modification, the mold case comprises a third edge and a fourth edge which are adjacent to the first edge and the second edge, the elastic support structure formed at the third edge, and the elastic support structure also biases the light guide body to the fourth edge.

According to another modification of the first embodiment of the present invention, the elastic support structure formed at the fourth edge, and the elastic support structure pushes the light guide body to the third edge.

According to another modification of the first embodiment of the present invention, the mold case comprises a first edge, a second edge, third edge and fourth edge, the light-emitting element is disposed near to the first edge, and the third edge and the fourth edge adjacent to the first edge, and the elastic support structure formed at the third edge, and the elastic support structure pushes the light guide body to the fourth edge.

According to another modification of the first embodiment of the present invention, the elastic support structure formed at the fourth edge, and the elastic support structure pushes the light guide body to the third edge.

According to another modification of the first embodiment of the present invention, the mold case is made of an elastic material and the elastic support structure is at least one curved projection as formed by letting part of the opposite edge be curved to said light guide body side.

According to another modification of the first embodiment of the present invention, the mold case has at the edge for receiving the light-emitting elements recess portions for individually receiving therein the light-emitting elements.

According to another modification of the first embodiment of the present invention, the light-emitting element is mounted on a printed circuit board to be installed at a location on a opposite side to the liquid crystal display panel of the light guide body.

According to another modification of the first embodiment of the present invention, further includes a metal case having an opening for exposure of a display region of the liquid crystal display panel and supporting the mold case receiving therein the light guide body and the light-emitting element and the printed circuit board. With this wrapping/ holding structure of the metal case, it is possible to obtain a liquid crystal display device in which the liquid crystal display panel and the mold case plus the printed circuit board are integrated together. Desirably, as the fixation structure due to wrap/hold of the metal case, known caulking fixation devices such as a folded hook or the like folded toward the back surface side of the printed circuit board is provided at a side-wall leading end portion of the metal case.

Another structure is also employable which causes the mold case and the metal case to be fixed together by providing an opening or a projection at a side face of the mold case to thereby form at the metal case a projection or opening which corresponds to this projection for rigid engagement of the both.

With the use of each of the above-noted arrangements, it is possible to provide a liquid crystal display device capable of obtaining a uniformly bright display screen without any brightness or luminance irregularities on the display screen as a result of efficient introduction of radiation light of light-emitting element, such as light-emitting diodes or the like, into the light guide body. The liquid crystal display panel to be used in this invention may be a liquid crystal panel of the type using the so-called simple matrix scheme or active matrix scheme such as the thin-film transistor type or the like or any other liquid crystal display panels using various schemes.

Further, in regard to the liquid crystal display device which makes use of a front light having a light guide body also, a similar arrangement is employable in the structure with its light-emitting element(s) being in close contact with the light guide body's light entry plane. In this case, the mold case is installed on the display screen side of the liquid crystal display panel whereas the printed circuit board is at the back surface of the liquid crystal display panel. Also, the size of such liquid crystal display panel is not limited to small sizes of handheld wireless telephone handsets and mobile information terminals or the like, and the is applicable to relatively large size liquid crystal display panels.

DESCRIPTION OF THE PREFERRED EMBODIMENTS

Figure 1:
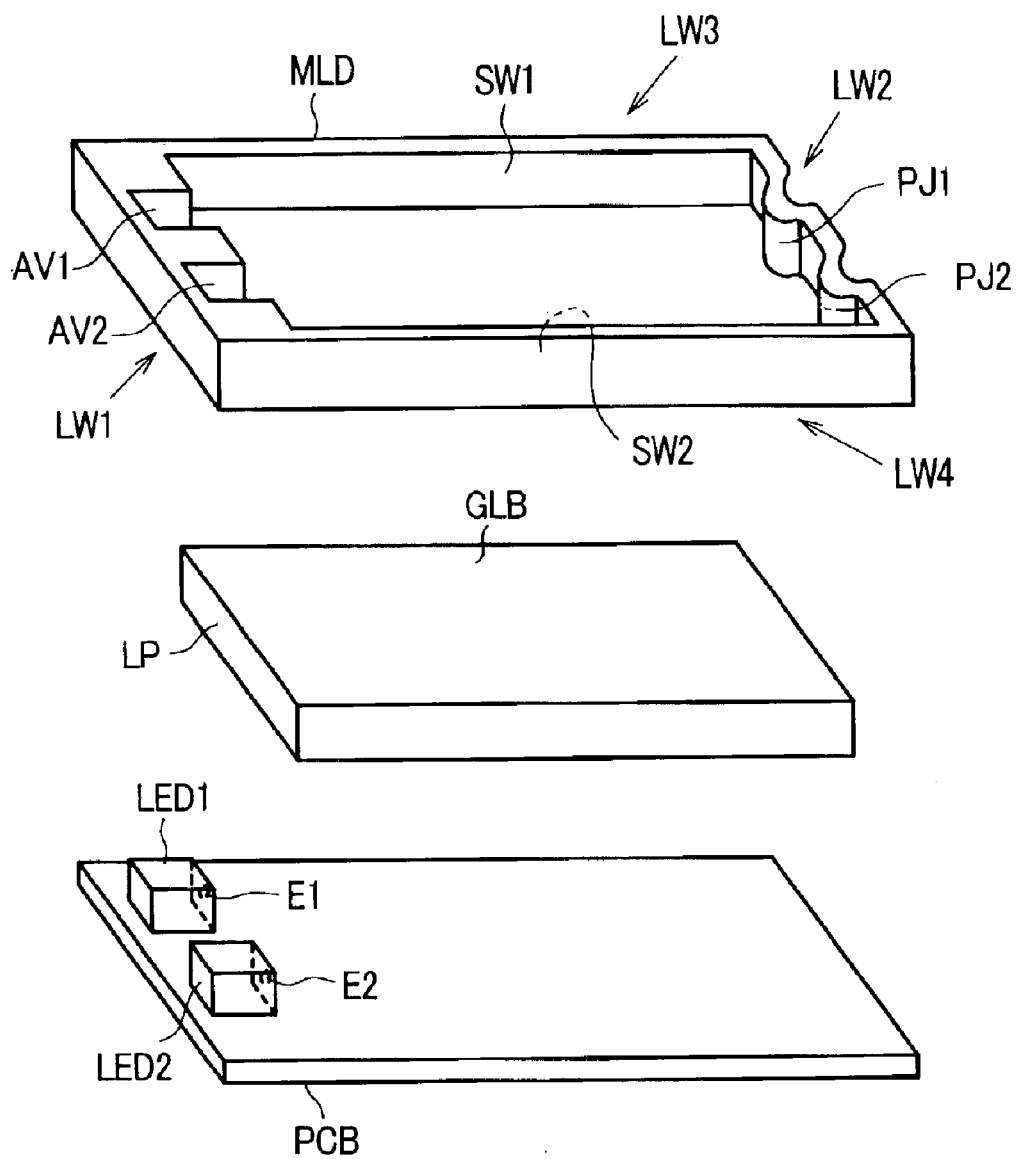
FIG. 1 is an exploded perspective view of a main structure of a first embodiment of the liquid crystal display device of the present invention, which structure excludes a liquid crystal display panel and a metal case thereof.

A detailed explanation will be given of a preferred form of the present invention with reference to the drawings of embodiments below. FIG. 1 is an exploded perspective view of a main part structure of a first embodiment of the liquid crystal display device in accordance with the instant invention, excluding a liquid crystal display panel and a metal case. A mold case MLD is an almost rectangular frame-shaped body. The mold case MLD is made of resin material having resiliency or elasticity as a whole. Receiving or accommodation portions AV1, AV2 of light-emitting diodes for use as light-emitting elements are formed in the inner wall of a first side edge LW1. Curved projections PJ1, PJ2 which protrude toward the inside are formed at a second side edge LW2 which is an opposite edge with respect to the first edge LW1. A third side edge LW3 and fourth edge LW4 which are adjacent to the first edge LW1 and second edge LW2 have parallel inner walls SW1, SW2. The light-emitting diode accommodation portion AV1, AV2 side of the mold case MLD becomes a light entry plane LP of light guide body GLB made of transparent resin material. The light guide body GLB may have reflection patterns formed on one or both surfaces thereof as will be described later. The reflection patterns are each constituted from either dots of white-colored paint or stripe print or grooves (embossing).

In FIG. 1, two light-emitting diodes LED1, LED2 are used as the light-emitting elements, and are mounted on a printed circuit board PCB, in a manner of planted like upstanding trees so that their light emission portions E1, E2 face the light entry plane of the light guide body GLB. Although the printed circuit board PCB may be a hard printed circuit board, a flexible printed circuit board is used in this embodiment with driver ICs and other electronics components mounted on the back surface thereof.

Figure 2A:
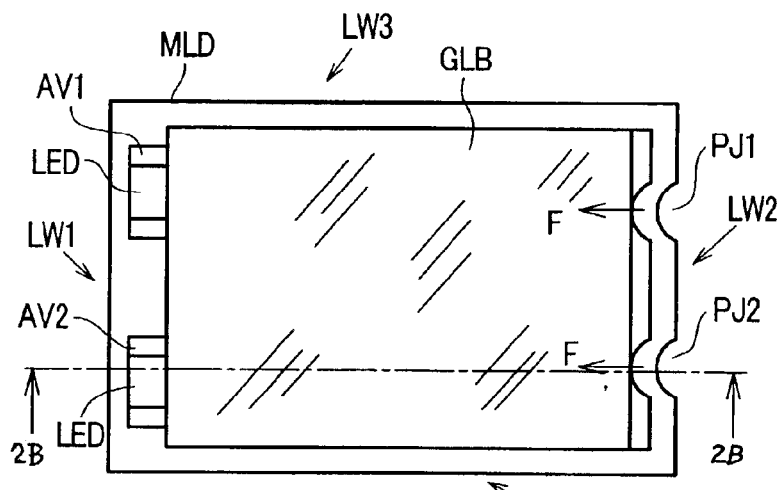
FIG. 2A is a plan view of an integrated state of the present invention shown in combination a printed circuit board mounting thereon light-emitting diodes while receiving a light guide body in the mold case as shown in FIG. 1
Figure 2B:
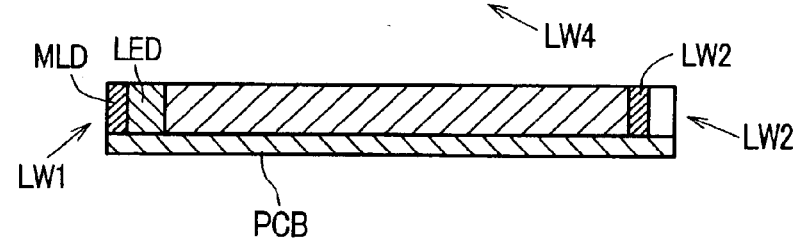
FIG. 2B is a sectional view of FIG. 2A taken along line 2B—2B.

FIG. 2A and FIG. 2B show an assembly of the light guide body received in the mold case of FIG. 1, and combined and integrated with the printed circuit board which mounts thereon the light-emitting diodes, wherein FIG. 2A is a plan view and FIG. 2B is a cross-sectional view as taken along line 2B—2B of FIG. 2A.

Assembly is achieved in the following manner. First, the printed circuit board PCB is attached so that the light-emitting diodes LED1, LED2 are received and fitted into the light-emitting diode accommodation portions AV1, AV2 of the mold case MLD. Although in FIG. 2A the size of the accommodation portions AV1, AV2 in a direction along the first edge LW1 are depicted to be greater than that of the light-emitting diodes LED1, LED2, this size is modified to have a significance approximating a corresponding size of light-emitting diode in cases where movement of the light-emitting diodes is controlled and restricted to this direction.

After having attached the printed circuit board PCB into the mold case, the light guide body GLB is fitted into the mold case so that the light entry plane (PL see FIG. 1) comes into contact with the light emission portions of the light-emitting diodes LED1, LED2 with the curved projections PJ1, PJ2 provided at the second edge LW2 pushing against the light guide body. Movement of side edges adjacent to the light entry plane of the light guide body GLB is controlled and restricted by the inner wall faces SW1, SW2 (see FIG. 1) of the third edge LW3 and fourth edge LW4.

With the use of such structure, the pushing/pressing force which is indicated by arrow F and which is generated due to elasticity of the curved projections PJ1, PJ2 is constantly applied to the light guide body GLB, resulting in the light entry plane LP (see FIG. 1) being biased into continues close contact with the light emission portions of the light-emitting diodes LED1, LED2 with the close contact being continuously maintained. Accordingly, light rays radiated from the light emission portions of the light-emitting diodes LED1, LED2 are effectively introduced into the interior of the light guide body GLB without leakage toward the outside of the light guide body GLB and also without experiencing reflection therebetween.

Figure 3:
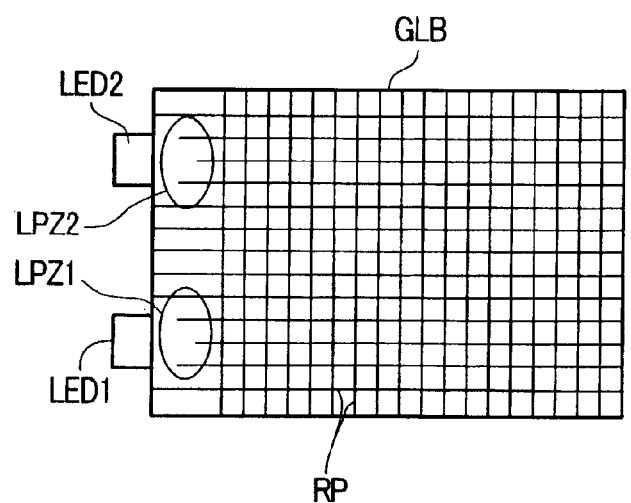
FIG. 3 shows a reflection pattern provided on the back surface of the light guide body for use in the first embodiment of the liquid crystal display device in accordance with this invention.

FIG. 3 shows reflection patterns which are provided at least on a back surface of the light guide body for use in the first embodiment of the liquid crystal display device in accordance with this invention. Although in this embodiment a great number of lattice-like grooves are formed as a reflection pattern RP on the both surfaces, such reflection pattern may be formed on the back face only. In some cases, this reflection pattern RP is not provided in regions LPZ1, LPZ2 proximate to the light emission portions of the light-emitting diodes LED1, LED2. The reflection patterns may be provided on both surfaces of the liquid guide body of the liquid crystal display device With such an arrangement, the amount of reflection light toward the liquid crystal display panel direction in the regions LPZ1, LPZ2 of the light emission portions of the light-emitting diodes LED1, LED2 is reduced resulting in the absence of any local high-luminance portions otherwise occurring due to the significance of the amount of illumination light which falls onto the liquid crystal display panel corresponding to the nearby regions LPZ1, LPZ2. Thus, it is possible to uniformly illuminate the screen of the liquid crystal display panel.

Figure 4:
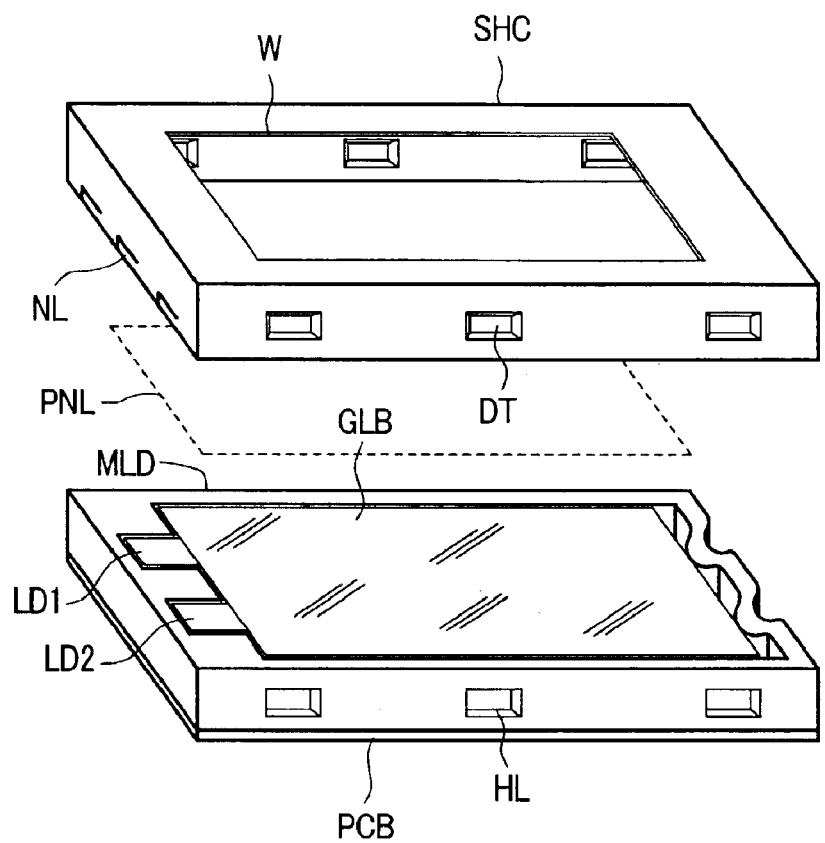
FIG. 4 is an exploded perspective view of a second embodiment of the liquid crystal display device in accordance with the invention.

FIG. 4 is an exploded perspective view of a second embodiment of the liquid crystal display device in accordance with the present invention. This embodiment adds an engagement structure with a metal case SHC to lateral faces of the mold case MLD which has been described in the above-noted embodiment. The liquid crystal display panel is indicated by dotted lines in this figure and an assembly structure of the light guide body GLB of the mold case MLD and the printed circuit board PCB with the light-emitting diodes LED1, LED2 mounted thereon is the same as that shown in FIGS. 1 to 3.

Openings HL are formed in side walls of the mold case MLD, and the metal case SHC has a window W which exposes the display region, wherein projections DT are formed on side walls at the metal case corresponding to the openings HL of the mold case MDL. The side-wall leading end portion of the metal case SHC is provided with a plurality of nail NL or the like which are foldable member foldable toward the back face side of the printed circuit board PCB. The side wall position at which the nail NL is provided on the metal case is not limited to the depicted position and similarly, the positions of openings HL provided in the side walls of the mold case MLD also are not limited to the illustrated portions.

For assembly, the mold case MLD is combined with the printed circuit board PCB and the liquid crystal display panel PNL and then, the projections DT of the metal case SHC are tightly engaged with the openings of the mold case MLD. Thereafter, the nails NL provided at the sidewall leading end portion of the metal case SHC are folded toward the back face of the printed circuit board PCB and then caulking is applied thereto so that a liquid crystal display device is obtained in which the liquid crystal display panel PNL and the mold case MLD plus the printed circuit board PCB contained in the metal case are integrally fixed together. It is apparent that one or more projections may be provided on the side wall side of the mold case MLD with openings formed on the metal case SHC side, although these openings are replaceable by recess portions.

Figure 5:
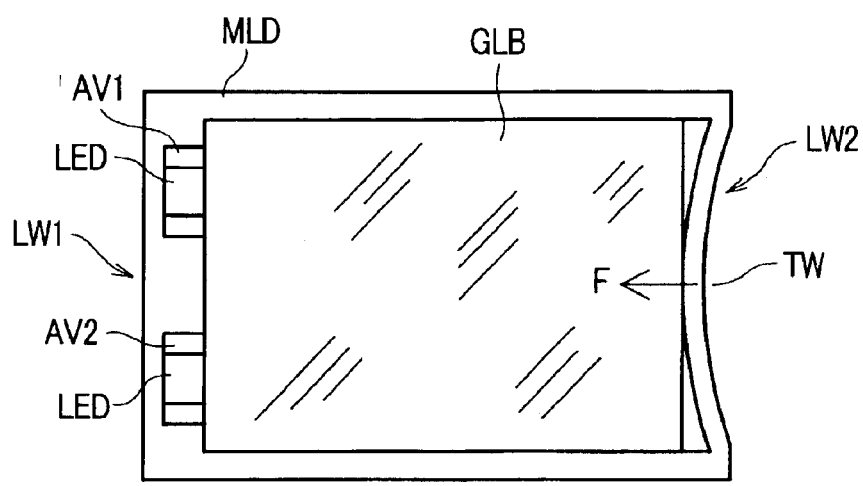
FIG. 5 is a plan view of a third embodiment of the liquid crystal display device in accordance with the invention, wherein a light guide body and light-emitting diodes are received in a mold case.

FIG. 5 is a plan view of a third embodiment of the liquid crystal display device in accordance with the present invention, wherein a light guide body and light-emitting diodes are received in the mold case thereof. Although in the above-described embodiments a plurality of (two) curved projections PJ1, PJ2 are formed at the second edge LW2 of the mold case MLD, this embodiment is arranged so that these curved projections are replaced with a curved projection TW extending along substantially the entire part of the second edge LW2 and gently protruded toward the light guide body GLB side. This curved projection can be reworded as a curved shape. The other arrangement is similar to that of the first embodiment; in addition, the structure for attachment of the metal case is also similar to that shown in FIG. 2A and FIG. 2B.

Similarly in this embodiment also, after completion of attachment of the printed circuit board PCB, the light entry plane (see FIG. 1) of the light guide body GLB comes into contact with the light emission portions of the light-emitting diodes LED1, LED2 to thereby be fitted it into the mold case MLD with the curved projection TW provided at the second edge LW2 biasing the light guide plate toward the light-emitting diodes. Movement of side edges adjacent to the light entry plane of light guide body GLB is controlled and restricted by the inner wall faces SW1, SW2 (see FIG. 1) of the third edge LW3 and fourth edge LW4.

With the use of such structure, the pushing/pressing force which is indicated by arrow F and which is generated due to elasticity of the curved projection TW is constantly applied to the light guide body GLB, resulting in the light entry plane LP (see FIG. 1) coming into continuous close contact with the light emission portions of the light-emitting diodes LED1, LED2 with the continuous close contact being maintained. Accordingly, light rays radiated from the light emission portions of the light-emitting diodes LED1, LED2 are effectively introduced into the interior of the light guide body GLB without leakage toward the outside of the light guide body GLB and also without experiencing reflection therebetween.

Figure 6:
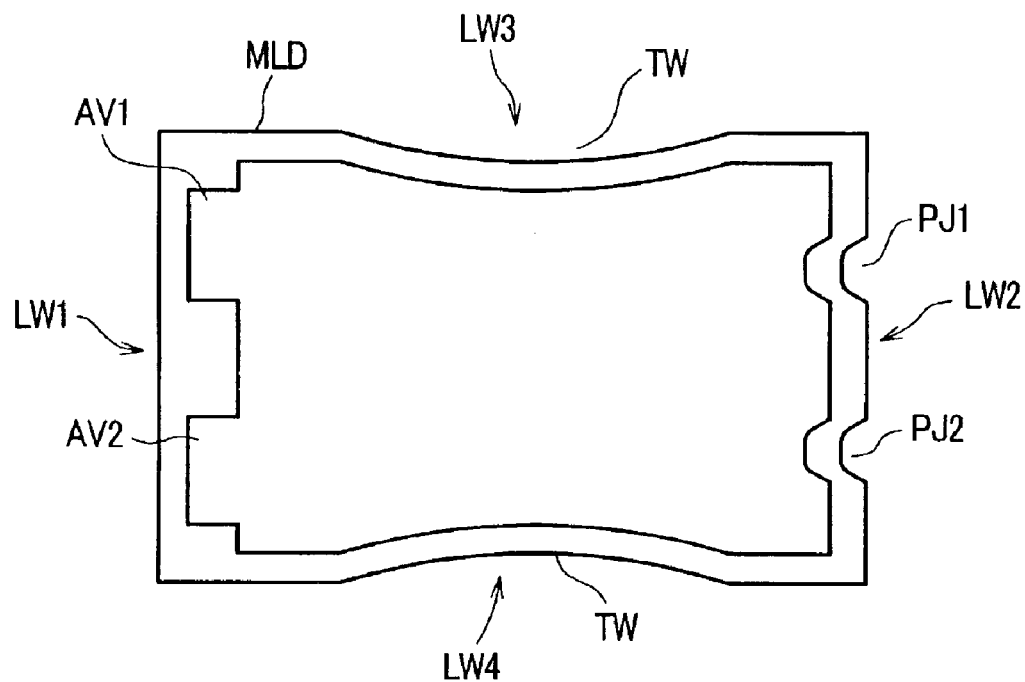
FIG. 6 is a plan view diagram for explanation of a fourth embodiment of the liquid crystal display device in accordance with the invention showing a mold case adapted to receive a light guide body and light-emitting diodes therein.
Figure 8:
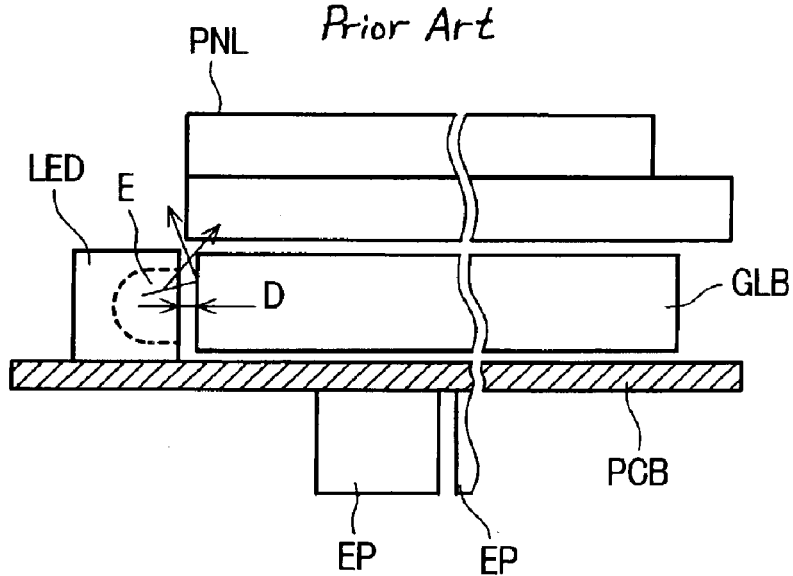
FIG. 8 is a cross-sectional view of a conventional main part structure of a liquid crystal display device having a backlight using light-emitting diodes for a light guide body as light-emitting elements.

FIG. 6 is a plan view of a fourth embodiment of the liquid crystal display device in accordance with the present invention, wherein a light guide body and light-emitting diodes are accommodated in its mold case. This embodiment is arranged so that curved projections TW are formed at the third edge LW3 and fourth edge LW4 of the mold case MLD, which projections are in the form of gentle protrusion of substantially the entire part of the third edge LW3 and fourth edge LW4 toward the light guide body GLB side in a similar way to that of FIG. 5. These curved projections can be reworded as curved shapes. The other arrangement is similar to that of the first embodiment as described above, and additionally, the structure for attachment of the metal case is also similar to that of FIG. 2.

In this embodiment also, after having attached the printed circuit board PCB to the mold case, the light entry plane (see FIG. 1) of the light guide body GLB comes into contact with the light emission portions of the light-emitting diodes LED1, LED2 be fitting into the mold case MLD while the light guide plate is biased by the curved projections PJ1, PJ2 provided at the second edge LW2 and the curved projections TW of the third edge LW3 and fourth edge LW4. Movement of side edges adjacent to the light entry plane of the light guide body GLB is controlled and restricted by the curved projections TW of the third edge LW3 and fourth edge LW4; thus, the light guide body GLB is well controlled and restricted in position variation in any direction.

With the use of such structure, the pushing/pressing force which is indicated by arrow F and which is generate due to elasticity of the curved projections TW is constantly applied to the light guide body GLB, resulting in the light entry plane LP (see FIG. 1) coming into continuous and close contact with the light emission portions of the light-emitting diodes LED1, LED2 and the continuous close contact is maintained. Additionally, movement toward the directions of the third edge LW3 and fourth edge LW4 is also controlled and restricted enabling the light which was radiated from the light emission portions of the light-emitting diodes LED1, LED2 to be efficiently introduced into the inside of the light guide body GLB without leakage to outside of the light guide body GLB and without experiencing reflection, therebetween. The curved projections PJ1, PJ2 of the second edge LW2 of FIG. 6 may be replaced by the curved projection TW as has been explained in FIG. 5.

Figure 7:
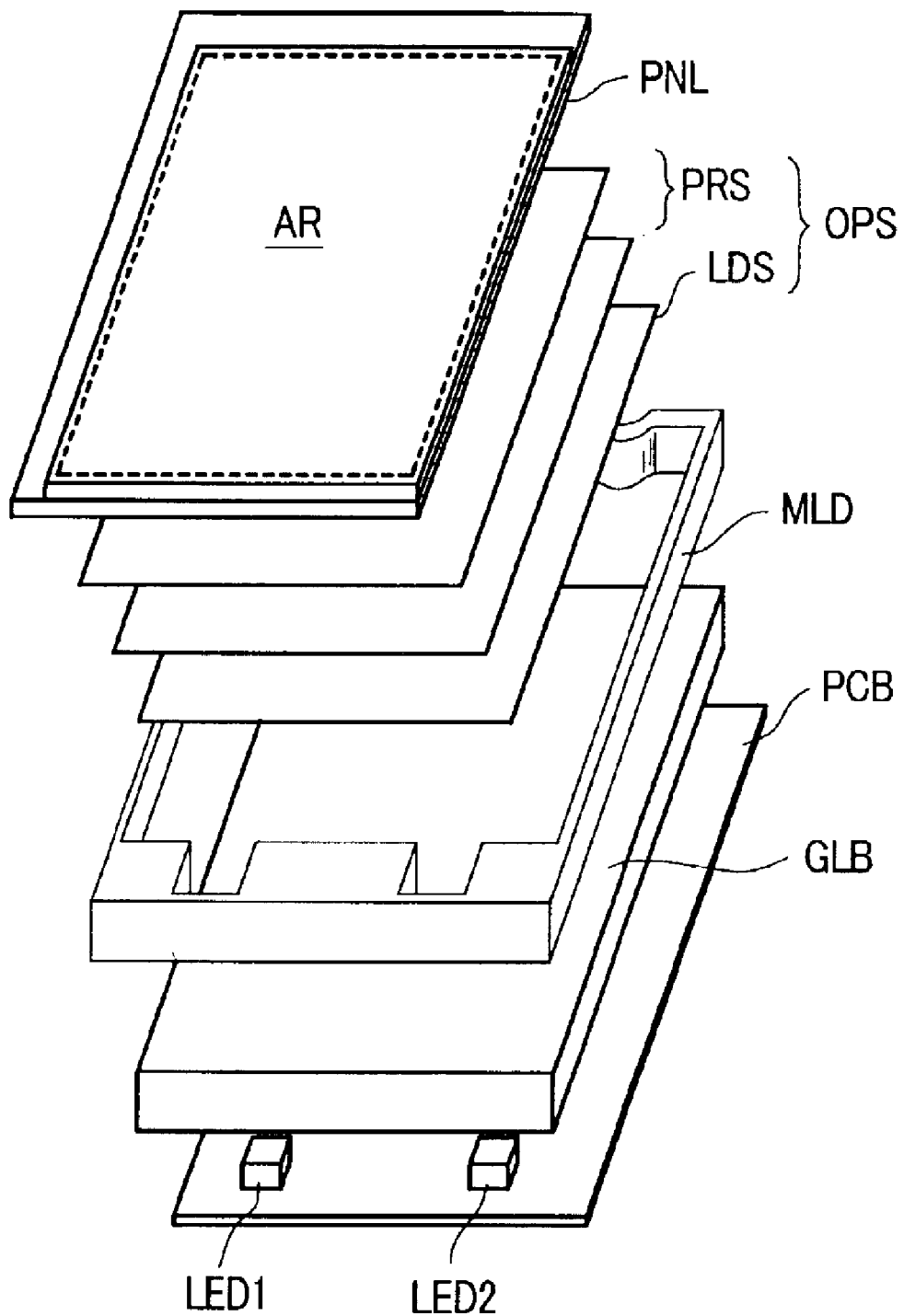
FIG. 7 is an exploded perspective view of the liquid crystal display device of the present invention.

FIG. 7 is an exploded perspective view of details of an overall structure of the liquid crystal display device of the present invention, wherein although the mold case shown herein corresponds to the mold case as shown in the way explained in the first embodiment, the mold case of another embodiment is also useable. Although the explanations of FIGS. 1 to 6 are such that illustration of optical sheets such as a diffusion sheet and a prism sheet or the like is eliminated, an optical sheet OPS which is formed of a diffusion sheet LDS and/or a prism sheet PRS is inserted between the liquid crystal display panel PNL and the light guide body GLB when the need arises.

Although a fixing or anchoring devices such as a spacer or double-face adhesive tape or else is inserted in some cases into specified portions between respective constituent elements, that is, between the diffusion sheet LDS and prism sheet PRS which make up the optical sheet OPS, between the optical sheet OPS and the liquid crystal display panel PNL, between the light guide body GLB and optical sheet OPS, and/or between the light guide body GLB and printed circuit board PCB, illustration thereof is omitted in order to make the understanding easier.

In this structure, two prism sheets PRS and diffusion sheet LDS are inserted at the back face of liquid crystal display panel PNL, wherein the mold case MLD with the light guide body GLB received therein is disposed on the lower side (back face) of the diffusion sheet LDS. The printed circuit board PCB on which the above-noted LEDs and other electronic components are mounted is placed beneath the light guide body GLB.

The printed circuit board PCB with the liquid crystal display panel PNL, optical sheet OPS, light guide body GLB, light-emitting diodes LED1, LED2 and others mounted thereon is held by a metal case as described in FIG. 4 and then arranged so as to provide an integral liquid crystal display device. A region indicated by dotted lines in the liquid crystal display panel PNL shows a display region AR, which is almost identical to an illumination region of the light guide body.

As described above, according to the present invention, in the state that both the light-emitting elements and the light guide body are received together in the mold case, the light guide body is pushed and pressed in the light-emitting element direction by the elastic structure which is provided at an opposite side edge of the edge of this mold case for accommodation of the light-emitting elements. In addition, providing an elastic structure for pressing the light guide body at the edge neighboring upon the mold case's light-emitting element accommodation edge forces the light-emitting elements to be in continuous close contact with the light entry plane of the light guide body to thereby ensure that the position thereof will be returned even upon application of external shock. Thus, radiation light of the light-emitting elements is efficiently introduced into the inside of the light guide body, which in turn makes it possible to illuminate the liquid crystal display panel with increased brightness or luminance.

Additionally, adjusting the reflection patterns on the both surfaces of the light guide body at locations in close proximity to the installation portions of the light-emitting elements makes it possible to lower the luminance at nearby portions of the light-emitting elements, which in turn enables provision of the intended liquid crystal display device capable of giving uniform illumination light to the liquid crystal display panel.

Figure 9A:
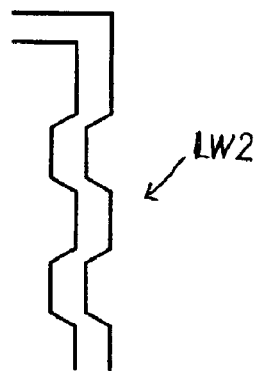
FIGS. 9A, 9B, 9C, 9D, 9E and 9F show portions of mold cases of other embodiments of the liquid crystal display devices in accordance with the invention.
Figure 9D:
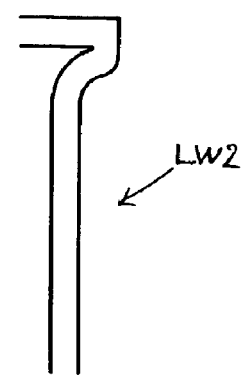
Figure 9B:
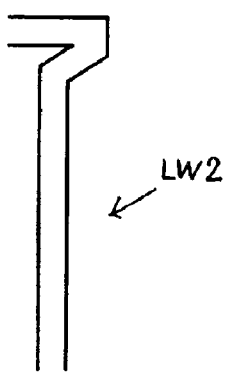
Figure 9E:
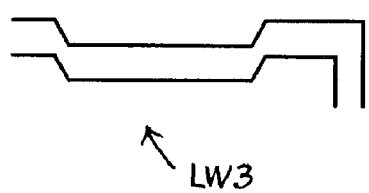
Figure 9C:
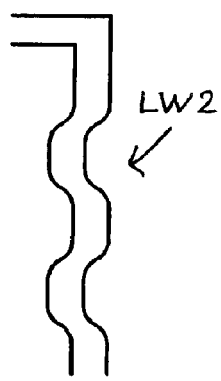
Figure 9F:
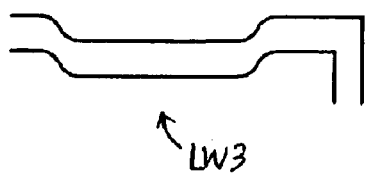

FIG. 9A, FIG. 9B, FIG. 9C and FIG. 9D are plan views of portions of the liquid crystal display device in accordance with the present invention, wherein a light guide body and light-emitting diodes are received in the mold case thereof. While in the above-described embodiments projections are formed at the second edge LW2 of the mold case which is an opposite edge of the edge of the light-emitting element. FIG. 9E and FIG. 9F are plan views of portions other embodiments of the liquid crystal display device in accordance with the present invention, wherein projections are formed at the third edge toward the light guide body side in a similar manner to that of FIG. 6.

The present invention is not limited to the above-noted arrangements and the structures of embodiments as described and, as apparent, may be modified and altered in a variety of ways without departing from the technical scope of the invention.

What is claimed is:

1. A liquid crystal display device comprising:
a liquid crystal display panel,
a light guide body disposed at a back face of the liquid crystal display panel,
a light-emitting element disposed proximate to a side wall of the light guide body, and
a mold case comprising an elastic support structure to hold the light guide body and to bias the light guide body,
wherein the mold case comprises a first edge, a second edge, a third edge and a fourth edge, the light-emitting element is disposed proximate to the first edge, and the third edge and the fourth edge are disposed adjacent to the first edge, and the elastic support structure is formed at the third edge and biases the light guide body toward the fourth edge.

2. A liquid crystal display device according to claim 1, wherein another elastic support structure is formed at the fourth edge and biases the light guide body toward the third edge.

3. A liquid crystal display device according to claim 1, wherein a further elastic support structure is formed at the second edge opposite to the first edge and biases the light guide body toward the light-emitting element.

4. A liquid crystal display device according to claim 1, wherein the mold case is coupled so as to provide and maintain contact between the light-emitting element and the light guide body.

5. A liquid crystal display device according to claim 1, wherein the first edge has a recess portion which accommodates the light emitting element therein.

6. A liquid crystal display device according to claim 5, wherein the light emitting element includes a plurality of light emitting diodes, and the first edge has a plurality of recess portions, each of the plurality of recess portions accommodating a respective one of the plurality of light emitting diodes therein.

7. A liquid crystal display device according to claim 1, wherein the light-emitting element is mounted on a printed circuit board for installation at a location opposite to the liquid crystal, display panel of the light guide body.

8. A liquid crystal display device according to claim 7, further comprising a metal case having an opening for exposure of a display region of the liquid crystal display panel and supporting the mold case which receives therein the light guide body, the light-emitting element and the printed circuit board.

9. A liquid crystal display device comprising:
a liquid crystal display panel;
a light guide body disposed at a back face of the liquid crystal display panel;
a light-emitting diode disposed proximate to a side wall of the light guide body; and
a mold case holding the light guide body, and comprising a first edge, a second edge opposite the first edge, a third edge adjacent to the first edge and the second edge, and a fourth edge opposite the third edge;
wherein the first edge comprises a recess portion accommodating the light-emitting diode therein;
wherein the second edge comprises an elastic support structure biasing the light guide body toward the first edge, the first edge receiving the light guide body biased by the second edge; and
wherein the third edge comprises another elastic support structure biasing the light guide body toward the fourth edge.

10. A liquid crystal display device according to claim 9, wherein the fourth edge comprises a further elastic support structure biasing the light guide body toward the third edge.

11. A liquid crystal display device according to claim 10, wherein the further elastic support structure of the fourth edge includes at least one curved projection when the light guide body is not held.

12. A liquid crystal display device according to claim 9, wherein the elastic support structure of the second edge includes at least one curbed projection when the light guide body is not held.

13. A liquid crystal display device according to claim 9, wherein the another elastic support structure of the third edge includes at least one curbed projection when the light guide body is not held.

14. A liquid crystal display device according to claim 9, wherein the light guide body includes reflection patterns on a surface thereof.

15. A liquid crystal display device according to claim 12, wherein the light guide body includes reflection patterns on a surface thereof.

16. A liquid crystal display device according to claim 9, wherein the light-emitting diode is mounted on a printed circuit board for installation at a location opposite the liquid crystal display panel of the light guide body.

17. A liquid crystal display device according to claim 16, further comprising a metal case having an opening for exposure of a display region of the liquid crystal display panel and supporting the mold case which receives therein the light guide body, the light-emitting diode and the printed circuit board.

* * * * *